United States Patent
Chung et al.

(10) Patent No.: US 11,456,878 B2
(45) Date of Patent: Sep. 27, 2022

(54) APPARATUS AND METHOD FOR MANAGING PSEUDONYM CERTIFICATES AND PREVENTING TRACKING THEREOF

(71) Applicants: Penta Security Systems Inc., Seoul (KR); Autocrypt Co., Ltd., Seoul (KR)

(72) Inventors: Myung Woo Chung, Seoul (KR); Hyun Min Choi, Seoul (KR); Sang Gyoo Sim, Seoul (KR); Eui Seok Kim, Seoul (KR); Duk Soo Kim, Seoul (KR); Seok Woo Lee, Seoul (KR)

(73) Assignees: PENTA SECURITY SYSTEMS INC., Seoul (KR); AUTOCRYPT CO., LTD., Seoul (KR)

( * ) Notice: Subject to any disclaimer, the term of this patent is extended or adjusted under 35 U.S.C. 154(b) by 0 days.

(21) Appl. No.: 17/155,447

(22) Filed: Jan. 22, 2021

(65) Prior Publication Data
US 2022/0141040 A1    May 5, 2022

(30) Foreign Application Priority Data
Oct. 29, 2020   (KR) .................. 10-2020-0141873

(51) Int. Cl.
*H04L 9/32*   (2006.01)
*H04L 9/06*   (2006.01)

(52) U.S. Cl.
CPC .......... *H04L 9/3265* (2013.01); *H04L 9/0631* (2013.01); *H04L 9/3268* (2013.01)

(58) Field of Classification Search
CPC .... H04L 9/3265; H04L 9/0631; H04L 9/3268
USPC .......................................................... 713/156
See application file for complete search history.

(56) References Cited

U.S. PATENT DOCUMENTS

| | | | | |
|---|---|---|---|---|
| 10,666,427 | B1 * | 5/2020 | Locketz | H04L 9/0643 |
| 11,018,875 | B2 * | 5/2021 | Chen | H04W 4/48 |
| 2018/0316511 | A1 * | 11/2018 | Meyer | G06F 9/45558 |
| 2019/0245703 | A1 * | 8/2019 | Simplicio Junior, Jr. | |
| | | | | H04L 9/0894 |

* cited by examiner

*Primary Examiner* — Bryan F Wright
(74) *Attorney, Agent, or Firm* — Goldilocks Zone IP Law

(57) ABSTRACT

A pseudonym certificate management method, performed by a pseudonym certificate management apparatus interworking with an external server, may comprise: receiving, from the external server, a pseudonym certificate in a state locked based on a root value identifiable only by the external server; periodically receiving an unlocking key for the pseudonym certificate from the external server; activating the pseudonym certificate with the unlocking key; and when the activated pseudonym certificate is abnormal, deactivating the pseudonym certificate.

12 Claims, 11 Drawing Sheets

| Certificate Validity Time Period | i=0 | i=1 | i=2 | i=3 | i=4 | i=5 | i=6 | i=7 | i=8 | i=9 | i=10 | i=11 | i=12 | i=13 |
|---|---|---|---|---|---|---|---|---|---|---|---|---|---|---|
| Unlocking Key Validity Time Period | t=0 | | | | t=1 (Activated Certificate) | | | | t=2 | | | | t=3 | |
| trackable period according to the prior arts | | | | | | | | | | | | | | |
| trackable period according to the proposed method | | | | | | | | | | | | | | | revocation ↓     ↓ recovery

FIG. 10

| Certificate Validity Time Period | i=0 | i=1 | i=2 | i=3 | i=4 | i=5 | i=6 | i=7 | i=8 | i=9 | i=10 | i=11 | i=12 | i=13 |
|---|---|---|---|---|---|---|---|---|---|---|---|---|---|---|
| Unlocking Key Validity Time Period | t=0 | | | | t=1 (Activated Certificate) | | | | t=2 | | | | t=3 | |
| CRL entry or the proposed method | | | | | | | | | | | | | | |
| trackable period | | | | | | | | | | | | | | | revocation ↓     ↓ recovery

FIG. 11

| Certificate Validity Time Period | i=0 | i=1 | i=2 | i=3 | i=4 | i=5 | i=6 | i=7 | i=8 | i=9 | i=10 | i=11 | i=12 | i=13 |
|---|---|---|---|---|---|---|---|---|---|---|---|---|---|---|
| Unlocking Key Validity Time Period | t=0 | | | | t=1 (Activated Certificate) | | | | | t=2 | | | t=3 | |
| CRL entry or the proposed method | | | | | | | | | | | | | | |
| trackable period | | | | | | | | | | | | | | |

↓ revocation    ↓ recovery

FIG. 12

APPARATUS AND METHOD FOR MANAGING PSEUDONYM CERTIFICATES AND PREVENTING TRACKING THEREOF

CROSS-REFERENCE TO RELATED APPLICATIONS

This application claims priority to Korean Patent Application No. 10-2020-0141873, filed on Oct. 29, 2020, with the Korean Intellectual Property Office (KIPO), the entire contents of which are hereby incorporated by reference.

BACKGROUND

1. Technical Field

The present disclosure relates to a method and an apparatus for managing a pseudonym certificate, and more specifically, to a method and an apparatus for managing a pseudonym certificate for secure Vehicle-to-Vehicle (V2V) communications.

2. Related Art

The security credential management system (SCMS) is a system for secure Vehicle-to-Everything (V2X) communications, which has been developed by the crash avoidance metrics partnership (CAMP), and this is a system to protect privacy through issuance of a plurality of pseudonym certificates.

A linkage value (LV) is utilized in the SCMS for privacy protection and efficient certificate revocation, and a linkage value is an identifier (ID) of a pseudonym certificate, and may also be used as a pseudonym ID of a vehicle. Thus, position tracking of the vehicle is also made possible through the linkage value.

Meanwhile, a linkage authority (LA) may assign a linkage seed (LS) value to each vehicle, extract a pre-linkage value (PLV) from the linkage seed value, and extract a linkage value representing an ID of a pseudonym certificate from the pre-linkage value. In addition, the linkage values may be periodically revoked in order to prevent vehicle tracking through the tracking of the pseudonym certificates. In this case, the linkage seed value for the linkage value is included in a certificate revocation list (CRL).

Certificate tracking is possible based on the linkage seed values included in the certificate revocation list. For example, if a pseudonym certificate is revoked at a specific time, it is possible to track pseudonym certificates revoked after the specific time through the certificate revocation list.

Meanwhile, pseudonym certificates may be distributed in advance due to the nature of vehicles with limited resources. If the linkage authority issues 20 pseudonym certificates a week for 3 years in advance, 3120 pseudonym certificates are required. Also, if a pseudonym certificate is revoked at a specific time, all the pseudonym certificates after the specific time should be revoked. Accordingly, an inefficiency problem arises in that a registration authority (RA) that registers pseudonym certificate in the SCMS should reissue 3120 pseudonym certificates again.

SUMMARY

In order to solve the above-identified problems, exemplary embodiments of the present disclosure are directed to preventing vehicle position tracking by preventing tracking of pseudonym certificates.

In order to solve the above-identified problems, exemplary embodiments of the present disclosure are directed to providing a method for efficiently managing pseudonym certificates.

According to an exemplary embodiment of the present disclosure for achieving the above-described objective, a pseudonym certificate management method, performed by a pseudonym certificate management apparatus interworking with an external server, may comprise: receiving, from the external server, a pseudonym certificate in a state locked based on a root value identifiable only by the external server; periodically receiving an unlocking key for the pseudonym certificate from the external server; activating the pseudonym certificate with the unlocking key; and when the activated pseudonym certificate is abnormal, deactivating the pseudonym certificate.

The external server may include a plurality of linkage authorities designated by the pseudonym certificate management apparatus.

The pseudonym certificate in the state locked based on the root value may be generated by: generating a plurality of linkage seed values for generating an identifier (ID) of the pseudonym certificate based on the root value identifiable by the plurality of linkage authorities; generating pre-linkage values (PLV) encrypted based on the linkage seed values according to an advanced encryption standard (AES); and generating a plurality of linkage values representing the ID of the pseudonym certificate based on the pre-linked values.

The linkage seed values may be encrypted based on the root value and connected in a tree structure.

The linkage seed values connected in the tree structure may be generated by being grouped according to a preset periodicity.

The linkage seed values within each group may be encrypted and connected, and an initial linkage seed value of each group may be represented by a linkage anchor seed (LAS) value generated based on the root value.

The deactivating of the pseudonym certificate comprises: identifying a linkage value of the pseudonym certificate through a linkage chain identifier (LCI); and stopping reception of the unlocking key based on the identified linkage value.

The pseudonym certificate management method may further comprise checking whether or not the pseudonym certificate has been deactivated through a certificate revocation list (CRL) issued by the external server.

According to another exemplary embodiment of the present disclosure for achieving the above-described objective, a pseudonym certificate management apparatus interworking with an external server may comprise a processor; and a memory storing at least one instruction executable by the processor, wherein when executed by the processor, the at least one instruction causes the processor to: receive, from the external server, a pseudonym certificate in a state locked based on a root value identifiable only by the external server; periodically receive an unlocking key for the pseudonym certificate from the external server; activate the pseudonym certificate with the unlocking key; and when the activated pseudonym certificate is abnormal, deactivate the pseudonym certificate.

The external server may include a plurality of linkage authorities designated by the pseudonym certificate management apparatus.

The pseudonym certificate in the state locked based on the root value may be generated by: generating a plurality of linkage seed values for generating an identifier (ID) of the pseudonym certificate based on the root value identifiable by the plurality of linkage authorities; generating pre-linkage values (PLV) encrypted based on the linkage seed values according to an advanced encryption standard (AES); and generating a plurality of linkage values representing the ID of the pseudonym certificate based on the pre-linked values.

The linkage seed values may be encrypted based on the root value and connected in a tree structure.

The linkage seed values connected in the tree structure may be generated by being grouped according to a preset periodicity.

The linkage seed values within each group may be encrypted and connected, and an initial linkage seed value of each group may be represented by a linkage anchor seed (LAS) value generated based on the root value.

In the deactivating of the pseudonym certificate, the at least one instruction may further cause the processor to: identify a linkage value of the pseudonym certificate through a linkage chain identifier (LCI); and stop reception of the unlocking key based on the identified linkage value.

The at least one instruction may further cause the processor to check whether or not the pseudonym certificate has been deactivated through a certificate revocation list (CRL) issued by the external server.

According to the exemplary embodiments of the present disclosure, the size of the pseudonym certificate revocation list may be reduced.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings.

Figure 1A:
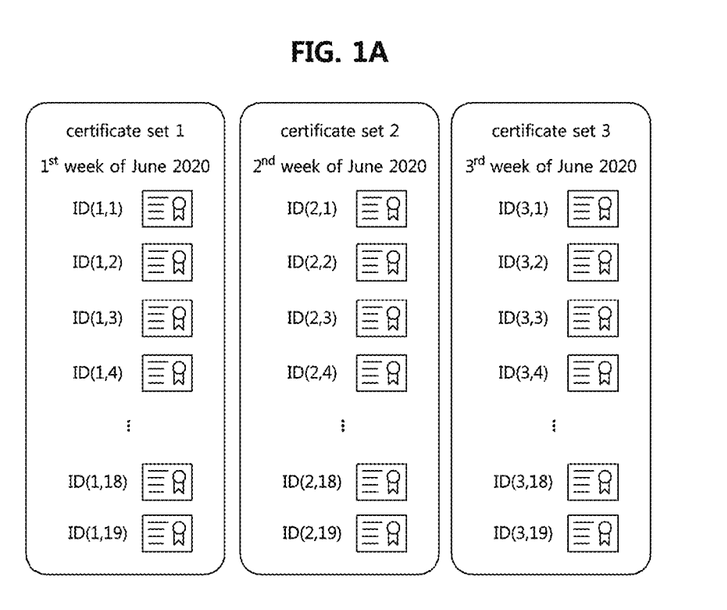
FIG. 1A is a first exemplary diagram for describing typical pseudonym certificates.
Figure 1B:
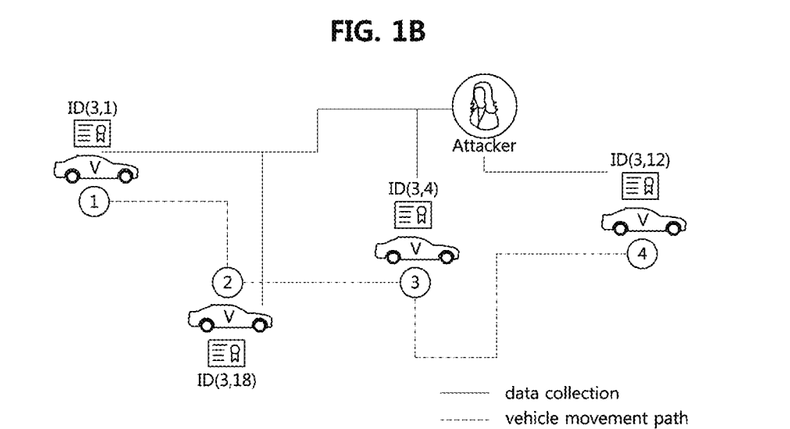
FIG. 1B is a second exemplary diagram for describing typical pseudonym certificates.

FIG. 1A is a first exemplary diagram for describing typical pseudonym certificates, and FIG. 1B is a second exemplary diagram for describing typical pseudonym certificates.

As shown in FIGS. 1A and 1B, a typical pseudonym certificate may have an ID, which may be expressed as a linkage value as described below. That is, a typical pseudonym certificate may be represented by ID (i, j), where i is a valid time of the pseudonym certificate, and j is a number of the pseudonym certificate.

For example, if a certificate set 1 of FIG. 1A is a set of pseudonym certificates of a specific vehicle in the first week of June 2020, the first week of June is a validity time of the pseudonym certificates, 1 to 19 are numbers of the pseudonym certificates reissued after being revoked at the first week of June 2020, and thus the pseudonym certificates included in the certificate set 1 may be expressed as ID (1, 1) and ID (1, 19).

Also, referring to FIG. 1B, an attacker who wants to track the position of the specific vehicle through the pseudonym certificates may collect the pseudonym certificates for the specific vehicle. However, since the identifiers of the pseudonym certificates are different, the relationship between the pseudonym certificates cannot be identified. Therefore, the vehicle may be identified as a different vehicle, and thus the vehicle cannot be tracked. For example, the specific vehicle may move in the order of positions 1 to 4, and the attacker may collect the specific vehicle's pseudonym certificates (i.e., ID (3, 1), ID (3, 18), ID (3, 4) and ID (3, 12)). In this case, since the respective pseudonym certificate IDs are different, the specific vehicle may be recognized as different vehicles, and it's impossible to track the specific vehicle.

Figure 2A:
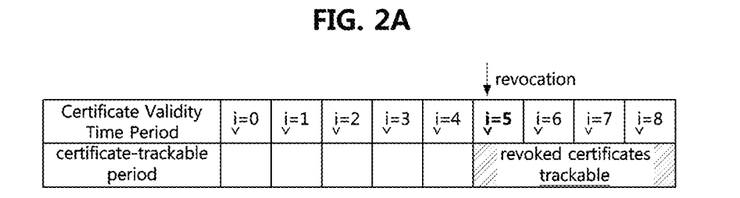
FIG. 2A is a first exemplary diagram for describing a conventional method of tracking a pseudonym certificate.
Figure 2B:
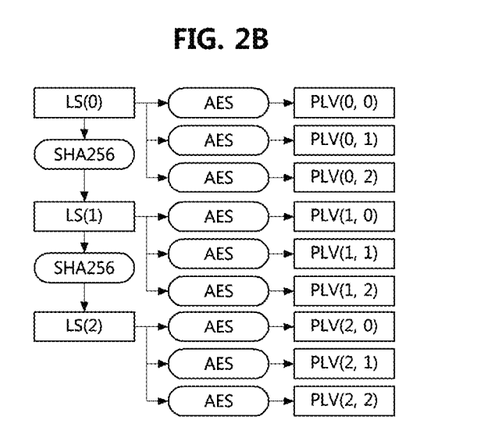
FIG. 2B is a second exemplary diagram for describing a conventional method of tracking a pseudonym certificate.

FIG. 2A is a first exemplary diagram for describing a conventional method of tracking a pseudonym certificate, and FIG. 2B is a second exemplary diagram for describing a conventional method of tracking a pseudonym certificate.

As described above, a typical pseudonym certificate may be revoked and reissued. There is a pseudonym certificate revocation list (CRL) for checking whether a specific pseudonym certificate has been revoked to prevent vehicle position tracking. Meanwhile, the certificate revocation list may include a linkage seed (LS) for identifying an ID of the revoked pseudonym certificate.

For example, referring to FIG. 2B, a typical pseudonym certificate may include a linkage seed (LS) value, a pre-linkage value (PLV), and a linkage value (LV), and the identifier ID (i, j) of the pseudonym certificate may be expressed as a linkage value LV (i, j).

In this case, the linkage value LV (i, j) may be extracted by Equations 1 to 3.

$$LV(i,j)=PLV_1(i,j) \text{ XOR } PLV_2(i,j) \quad \text{[Equation 1]}$$

$$PLV(i,j)=\text{GeneratePLV}(LS(i),j) \quad \text{[Equation 2]}$$

$$LS(i+1)=\text{hash}(LS(i)) \quad \text{[Equation 3]}$$

An initial value LS (0) of the linkage seed may have an arbitrary value.

Meanwhile, as described above, the pseudonym certificate revocation list may include a linkage seed value. Since a linkage value corresponding to the ID of the revoked pseudonym certificate can be obtained through the linkage seed value, it is possible to track the revoked pseudonym certificate through the pseudonym certificate revocation list.

For example, referring to FIGS. 2A and 2B, when a pseudonym certificate is revoked at i=5, the certificate revocation list may include LS (5), and since all pseudonym certificates have a connected structure, the pseudonym certificates from LS (5) may be tracked.

Figure 3:
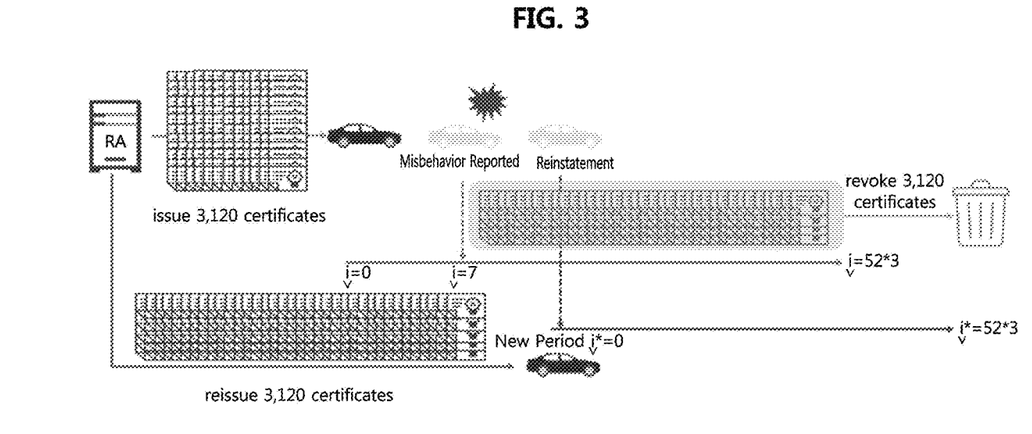
FIG. 3 is an exemplary diagram for describing a conventional method of revoking a pseudonym certificate.

FIG. 3 is an exemplary diagram for describing a conventional method of revoking a pseudonym certificate.

Referring to FIG. 3, conventionally, pseudonym certificates are repeatedly revoked and reissued. For example, if the linkage authority issues 20 pseudonym certificates a week for 3 years in advance, 3120 pseudonym certificates are required. Also, if a pseudonym certificate is revoked at a specific time, all the pseudonym certificates after the specific time should be revoked. Accordingly, an inefficiency problem arises in that a registration authority (RA) that registers pseudonym certificate in the SCMS should reissue 3120 pseudonym certificates again.

Figure 4:
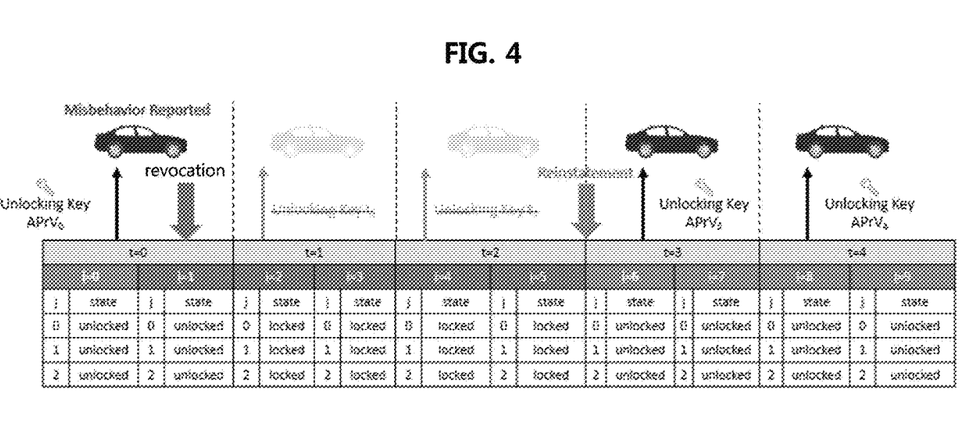
FIG. 4 is an exemplary diagram for describing a method of activating a pseudonym certificate.

FIG. 4 is an exemplary diagram for describing a method of activating a pseudonym certificate.

Referring to FIG. 4, as described above, a method for solving the problem caused by reissuing pseudonym certificates in the registration authority can be seen. For example, there is a method of distributing a pseudonym certificate to a vehicle in a state locked with a locking key and distributing an unlocking key to the vehicle to activate the pseudonym certificate. In this case, the pseudonym certificate can be reused by stopping the provision of the unlocking key distributed to the vehicle instead of revoking the pseudonym certificate, and activating the pseudonym certificate by redistributing the unlocking key to the vehicle instead of reissuing the pseudonym certificate. Therefore, the problem caused by revocation or reissuance of the pseudonym certificate may not occur.

Figure 5A:
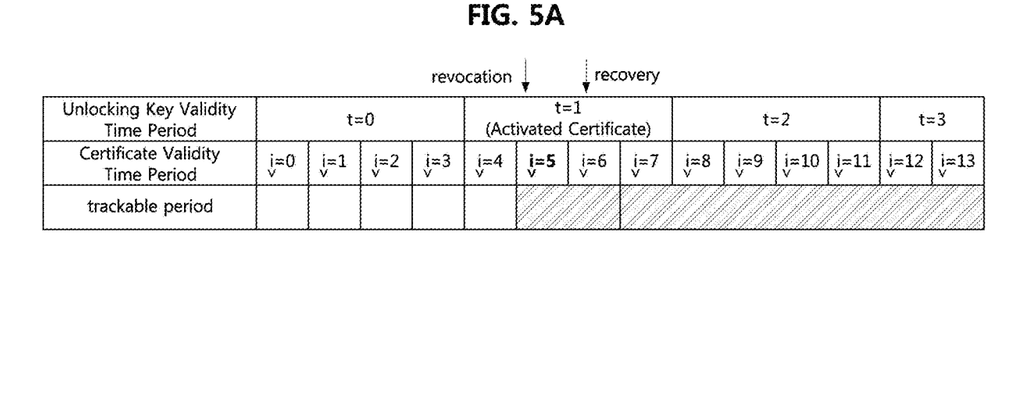
FIG. 5A is a first exemplary diagram for describing a privacy problem caused by activating a pseudonym certificate.
Figure 5B:
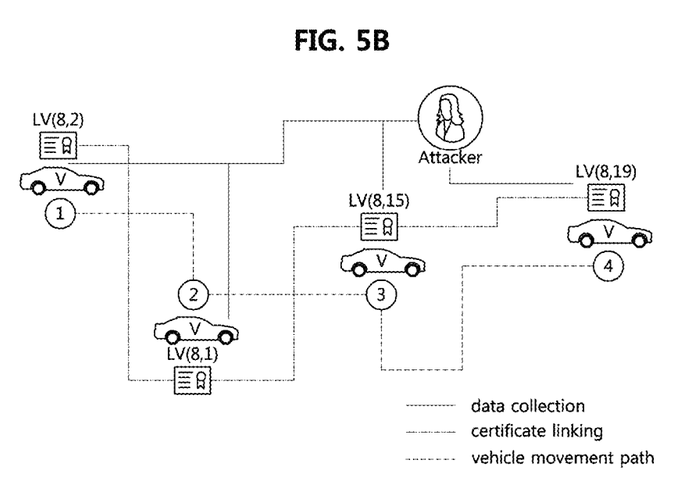
FIG. 5B is a second exemplary diagram for describing a privacy problem caused by activating a pseudonym certificate.

FIG. 5A is a first exemplary diagram for describing a privacy problem caused by activating a pseudonym certificate, and FIG. 5B is a second exemplary diagram for describing a privacy problem caused by activating a pseudonym certificate.

As described above, if the locking key and the unlocking key are used instead of revoking or reissuing the pseudonym certificate, the problem of unnecessarily revoking or reissuing pseudonym certificates in the linkage authority and the registration authority registering the pseudonym certificates may be solved. However, when the distribution of the unlocking key of the pseudonym certificate is stopped, it is still possible to track the position of the specific vehicle through the linkage seed value included in the pseudonym certificate revocation list. This is a problem that occurs because all the linkage seed values of the pseudonym certificates are linked.

For example, referring to FIGS. 5A and 5B, when distribution of the pseudonym certificate's unlocking key is stopped at i=5, the attacker may extract LS (8) from LS (5) included in the pseudonym certificate revocation list, PLV (8, j) may be extracted from LS (8), and LV (8, j) may be extracted through PLV (8, j). Therefore, the attacker may track the position of the specific vehicle through the linkage value LV (8, j).

Since the pseudonym certificate position can be tracked for the specific time in the above manner, there is a problem that the privacy of the specific vehicle cannot be protected even if the pseudonym certificate is activated in the conventional manner.

Figure 6:
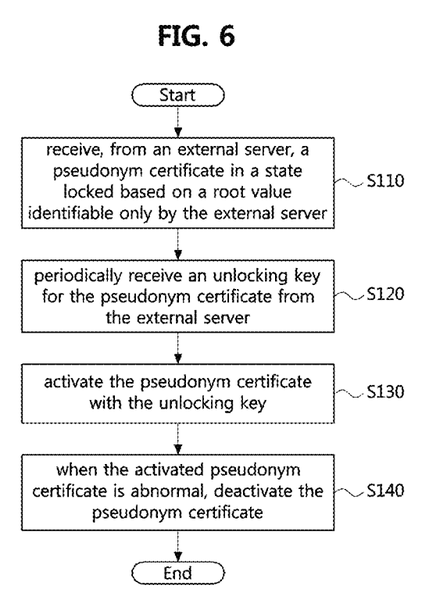
FIG. 6 is a flowchart illustrating a pseudonym certificate management method according to an exemplary embodiment of the present disclosure.

FIG. 6 is a flowchart illustrating a pseudonym certificate management method according to an exemplary embodiment of the present disclosure.

Referring to FIG. 6, a pseudonym certificate management method according to an exemplary embodiment of the present disclosure is a pseudonym certificate management method performed by a pseudonym certificate management apparatus interworking with an external server, and may include a step S110 of receiving, from the external server, a pseudonym certificate in a state locked based on a root value identifiable only by the external server.

Here, the external server may include a plurality of linkage authorities (LA) designated by the pseudonym certificate management apparatus.

Meanwhile, the pseudonym certificate in the state locked based on the root value identifiable only by the external server may generated by generating a plurality of linkage seed values for generating a pseudonym certificate ID based on the root value identifiable only by the plurality of linkage authorities, generating a pre-linkage value (PLV) encrypted based on the linkage seed value according to an advanced encryption standard (AES), and generating a plurality of linkage values representing a pseudonym certificate ID based on the pre-linkage value.

Here, the linkage seed values may be encrypted based on the root value and connected in a tree structure. In addition, the linkage seed values connected in the tree structure may be generated by being grouped according to a preset periodicity. Meanwhile, the linkage seed values generated and grouped within each group may be connected as being encrypted.

In addition, the present disclosure may include a step S120 of periodically receiving an unlocking key for the pseudonym certificate from the external server. Also, the present disclosure may include a step S130 of activating the pseudonym certificate with the unlocking key. Also, the present disclosure may further include a step S140 of deactivating the activated pseudonym certificate if the pseudonym certificate is abnormal.

Here, the step S140 of deactivating the activated pseudonym certificate if the pseudonym certificate is abnormal may comprise a step of identifying a linkage value of the pseudonym certificate through a linkage chain identifier (LCI); and a step of stopping reception of the unlocking key based on the identified linkage value.

Meanwhile, the pseudonym certificate management method according to an exemplary embodiment of the present disclosure may further include a step of checking whether the pseudonym certificate has been deactivated through a certificate revocation list (CRL) issued by the external server.

Figure 7:
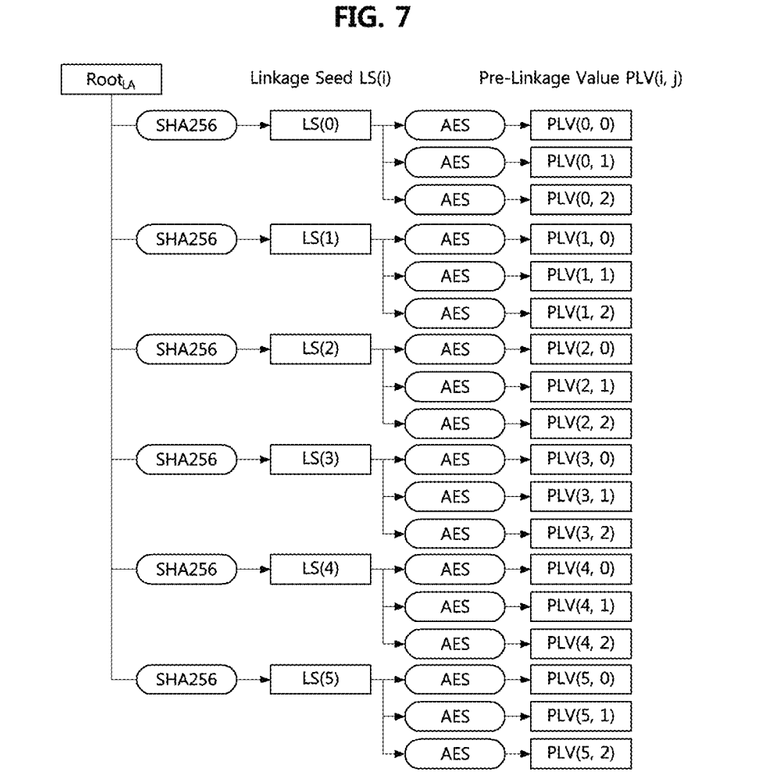
FIG. 7 is a first exemplary diagram of a pseudonym certificate management method according to an exemplary embodiment of the present disclosure.
Figure 8:
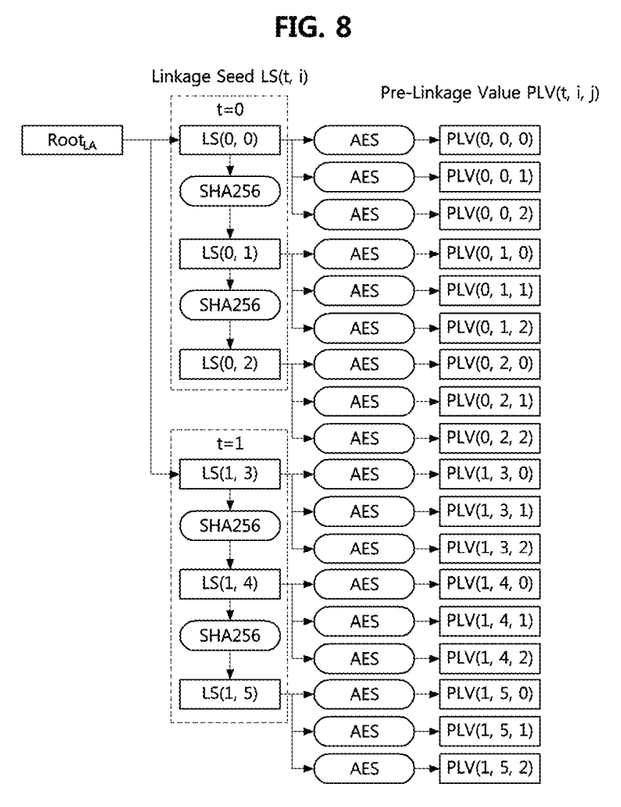
FIG. 8 is a second exemplary diagram of a pseudonym certificate management method according to an exemplary embodiment of the present disclosure.

FIG. 7 is a first exemplary diagram of a pseudonym certificate management method according to an exemplary embodiment of the present disclosure, and FIG. 8 is a second exemplary diagram of a pseudonym certificate management method according to an exemplary embodiment of the present disclosure.

As described above, the conventional method of revoking and reissuing pseudonym certificates or the conventional method of activating pseudonym certificates have the problem that the linkage seed values are all linked and thus the pseudonym certificate can still be tracked even when the pseudonym certificate is revoked or the distribution of the unlocking key is stopped.

According to an exemplary embodiment of the present disclosure, a linkage seed value may be generated based on a root value received from the linkage authority, so that connections between pseudonym certificates may be released unlike the conventional pseudonym certificates. That is, referring to FIG. 7, in the present disclosure, each linkage seed value may be generated by encrypting a root value identifiable only by the linkage authority, and the linkage seed values may be generated in a tree structure based on the root value. Here, the root value can only be identified by a plurality of linkage authorities designated by a pseudonym certificate management apparatus to be described later.

Meanwhile, the plurality of linkage authorities may extract a linkage seed value from the root value, extract a pre-linkage value based on the linkage seed value, and extract each linkage value based on the pre-linkage value. That is, in order to prevent an attacker from tracking a vehicle through the pseudonym certificate, a plurality of linkage authorities may independently perform the extraction of the linkage value from the linkage seed value.

Also, since the linkage seed values are generated from the root value and are not connected to each other, even if a pseudonym certificate is revoked, the attacker cannot track the location of the specific pseudonym certificate through the linkage seed value. Here, the linkage seed value may be calculated by Equation 4.

$$LS(i) = hash(Root_{LA} \| ID_{LA} \| i) \qquad \text{[Equation 4]}$$

Here, $ID_{LA}$ may mean an ID of the linkage authority designated by the pseudonym certificate management apparatus to be described later.

In addition, referring to FIG. 8, in the present disclosure, the linkage seed values connected in the tree structure may be generated by being grouped according to a preset periodicity. In this case, the preset periodicity may be set by the pseudonym certificate management apparatus. For example, the linkage seed values of i=0,1,2 corresponding to t=0 may be connected and grouped, and the linkage seed values of i=3,4,5 corresponding to t=1 may be connected and grouped.

Meanwhile, the initial linkage seed value at the time t may be referred to as LAS (t), which is a linkage anchor seed (LAS) value. For example, referring to FIG. 8, LAS (0) may mean LS (0,0) and may mean hash($Root_{LA} \| ID_{LA} \| 0$). In addition, LAS (10) may mean LS (1,1), and may mean hash($Root_{LA} \| ID_{LA} \| 1$).

In addition, while grouping the linkage seed values connected in the tree structure according to the preset periodicity, the linkage seed values may be defined as in Equation 5, and the pre-linkage values PLV may be defined as in Equation 6.

$$LS(t,i+1) = hash(ID_{LA} \| LS(t,i)) \qquad \text{[Equation 5]}$$

$$PLV(t,i,j) = E(LS(t,i), ID_{LA} \| j) \qquad \text{[Equation 6]}$$

Here, E may mean encryption, and in Equation 6, it may mean encrypting $ID_{LA}$ with LS (t, i).

Figure 9:
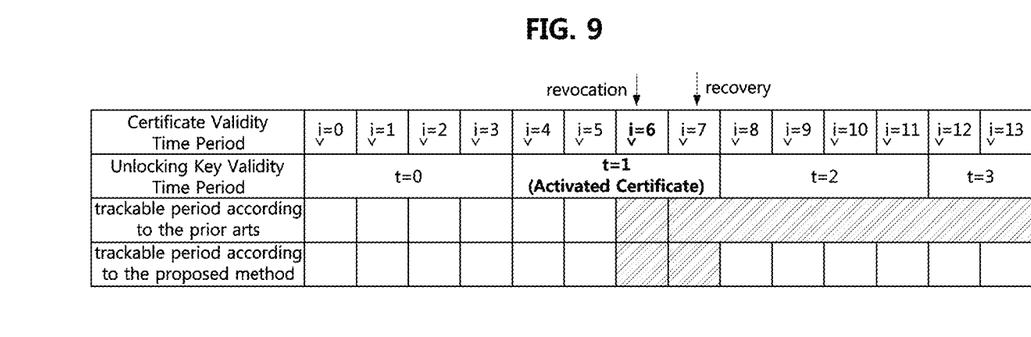
FIG. 9 is a first exemplary diagram for describing a privacy problem that may occur by recovering a revoked certificate according to the present disclosure.
Figure 10:
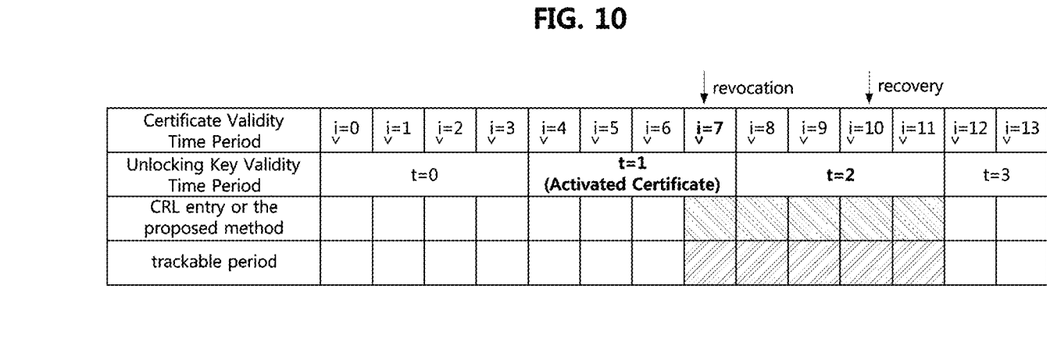
FIG. 10 is a second exemplary diagram for describing a privacy problem that may occur by recovering a revoked certificate according to the present disclosure.
Figure 11:
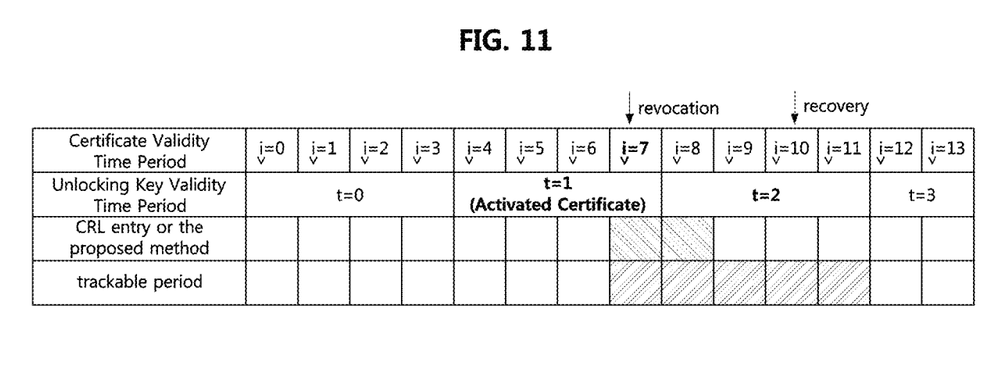
FIG. 11 is a third exemplary diagram for describing a privacy problem that may occur by recovering a revoked certificate according to the present disclosure.

FIG. 9 is a first exemplary diagram for describing a privacy problem that may occur by recovering a revoked certificate according to the present disclosure, FIG. 10 is a second exemplary diagram for describing a privacy problem that may occur by recovering a revoked certificate according to the present disclosure and FIG. 11 is a third exemplary diagram for describing a privacy problem that may occur by recovering a revoked certificate according to the present disclosure.

Referring to FIG. 9, it can be seen that the position of a specific vehicle cannot be tracked in the exemplary embodiments of the present disclosure, compared to the case of the conventional pseudonym certificate management method. For example, if a certificate is revoked at i=6, according to the present disclosure, a specific vehicle does not receive an unlocking key corresponding to t=2, so that the pseudonym certificate corresponding to t=2 can be kept locked.

Meanwhile, in the present disclosure, unlike the conventional certificate management method, connections of all linkage seed values included in the pseudonym certificate are released, so that all information on the time when the pseudonym certificate is revoked and recovered may be included in the pseudonym certificate revocation list. For example, the certificate revocation list (CRL) may include only information on i=6, 7 corresponding to t=1 including the time when the certificate is revoked. That is, the certificate revocation list may include LS (6) and LS (7).

On the other hand, if the certificate is recovered at i=7 (i.e., if the unlocking key is distributed), the attacker may track the pseudonym certificate for a time after i=8 from LS (6) and LS (7) included in the certificate revocation list. However, since LS (8) cannot be extracted unless the route value is known, the privacy of the specific vehicle can be protected.

Referring to FIG. 10, when the pseudonym certificate is revoked at i=7 (distribution of the unlocking key is stopped), and the pseudonym certificate is recovered at i=10 (i.e., when the unlocking key is distributed), since the time points corresponding to them are different, the certificate revocation list may include all information corresponding to the respective time points. That is, the certificate revocation list may include LS (7), LS (8), LS (9), LS (10), and LS (11). In this case, the certificate revocation list may have a problem that the size of the certificate revocation list becomes larger than that of the conventional certificate management method.

However, as described above, in the present disclosure, since the linkage seed values connected in the tree structure are generated by being grouped according to a preset periodicity, and the linkage seed values within each group are encrypted and connected, the certificate revocation list may not include all information about when the pseudonym certificate is revoked and recovered.

For example, referring to FIG. 11, when the pseudonym certificate is revoked at i=7 (distribution of the unlocking key is stopped), and the pseudonym certificate is recovered at i=10 (i.e., when the unlocking key is distributed), since the time points corresponding to them are different, the certificate revocation list may include all information corresponding to the respective time points. However, unlike the case of FIG. 10, the certificate revocation list may include only LS (7) and LS (8). That is, since the linkage seed values in the group corresponding to t=2 are encrypted and all connected, and LS (11) can be calculated from LS (8), the certificate revocation list may not include LS (9), LS (10) and LS (11). Therefore, the size of the certificate revocation list can be reduced.

Meanwhile, the present disclosure may include the step of deactivating the activated pseudonym certificate if the pseudonym certificate is abnormal. In this case, the step of deactivating the pseudonym certificate may include at step of identifying a linkage value of the pseudonym certificate through a linkage chain identifier (LCI) and a step of stopping receiving an unlocking key based on the identified linkage value.

Meanwhile, the LCI may be as in Equation 7.

$$LCI=Enc(Pubkey_{LA}, Root_{LA}) \qquad \text{[Equation 7]}$$

Here, $Pubkey_{LA}$ may mean a public key of the linkage authority, and $Root_{LA}$ may mean the root value identifiable by the linkage authority. That is, the LCI may be encrypted by the public key and the root value, and the linkage value of the pseudonym certificate that is revoked through the LCI may be identified. Meanwhile, reception of the unlocking key may be stopped based on the linkage value identified through the LCI.

Figure 12:
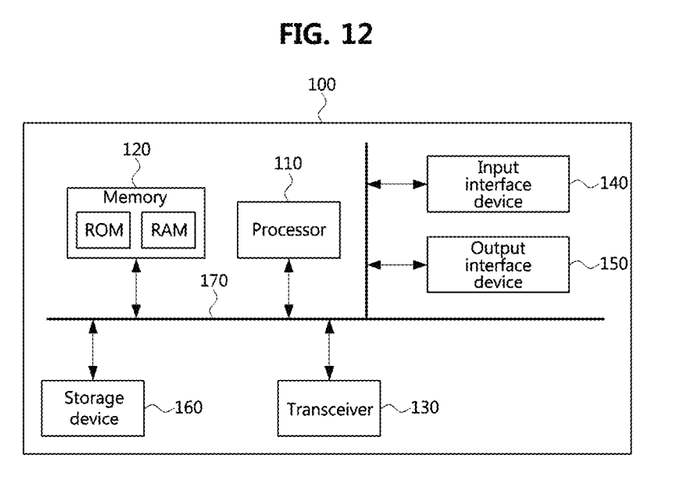
FIG. 12 is a block diagram of a pseudonym certificate management apparatus according to an exemplary embodiment of the present disclosure.

FIG. 12 is a block diagram of a pseudonym certificate management apparatus according to an exemplary embodiment of the present disclosure.

As shown in FIG. 12, a pseudonym certificate management apparatus 100 according to an exemplary embodiment of the present disclosure may comprise a processor 110, a memory 120 for storing at least one instruction executable by the processor and results of execution of the at least one instruction, and a transceiver 130 connected to a network for performing communications.

The pseudonym certificate management apparatus 100 may further comprise an input interface device 140, an output interface device 150, a storage device 160, and the like. Each component included in the module management apparatus 100 may communicate with each other as connected through a bus 170. However, each component included in the module management apparatus 100 may be connected to the processor 110 via an individual interface or a separate bus, rather than the common bus 170. For example, the processor 110 may be connected to at least one of the memory 120, the transceiver 130, the input interface device 140, the output interface device 150, and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random-access memory (RAM).

The storage device 160 may also store a root value identifiable only by a linkage authority, and may store an initial linkage seed value based on the root value, a linkage seed value generated based on the root value, a pre-linkage value, and a linkage value. In addition, it may further store a preset periodicity for revoking the linkage values and a preset periodicity for grouping the linkage seed values connected in a tree structure.

Here, the at least one instruction may cause the processor to: receive, from the external server, a pseudonym certificate in a state locked based on a root value identifiable only by the external server; periodically receive an unlocking key for the pseudonym certificate from the external server; activate the pseudonym certificate with the unlocking key; and when the activated pseudonym certificate is abnormal, deactivate the pseudonym certificate.

Meanwhile, the pseudonym certificate in the state locked based on the root value may be generated by generating a plurality of linkage seed values for generating an identifier (ID) of the pseudonym certificate based on the root value identifiable by the plurality of linkage authorities; generating pre-linkage values (PLV) encrypted based on the linkage seed values according to an advanced encryption standard (AES); and generating a plurality of linkage values representing the ID of the pseudonym certificate based on the pre-linked values.

Also, in the deactivating of the pseudonym certificate, the at least one instruction may further cause the processor to: identify a linkage value of the pseudonym certificate through a linkage chain identifier (LCI); and stop reception of the unlocking key based on the identified linkage value.

Meanwhile, the at least one instruction may further cause the processor to check whether or not the pseudonym certificate has been deactivated through a certificate revocation list (CRL) issued by the external server.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

Although the present disclosure has been described with reference to preferred embodiments, it will be apparent to those skilled in the art that the present disclosure may be variously changed and modified without departing from the spirit and scope of the invention defined in the following claims.

What is claimed is:

1. A method for managing pseudonym certificates and preventing tracking thereof, performed by a pseudonym certificate management apparatus interworking with an external server, the method comprising:
receiving, from the external server, a pseudonym certificate in a state locked based on a root value identifiable only by the external server;
periodically receiving an unlocking key for the pseudonym certificate from the external server;
activating the pseudonym certificate with the unlocking key; and
when the activated pseudonym certificate is abnormal, deactivating the pseudonym certificate,
wherein the pseudonym certificate in the state locked based on the root value is generated by generating a plurality of linkage seed values for generating an identifier (ID) of the pseudonym certificate based on the root value identifiable by the plurality of linkage authorities; generating pre-linkage values (PLV) encrypted based on the linkage seed values according to an advanced encryption standard (AES); and
generating a plurality of linkage values representing the ID of the pseudonym certificate based on the pre-linked values,
wherein the linkage seed values are generated by being grouped according to a preset periodicity into a plurality of groups which not connected to each other.

2. The method for managing pseudonym certificates and preventing tracking thereof according to claim 1, wherein the external server includes a plurality of linkage authorities designated by the pseudonym certificate management apparatus.

3. The method for managing pseudonym certificates and preventing tracking thereof according to claim 1, wherein the linkage seed values are encrypted based on the root value and connected in a tree structure.

4. The method for managing pseudonym certificates and preventing tracking thereof according to claim 1, wherein the linkage seed values within each group are encrypted and connected, and an initial linkage seed value of each group is represented by a linkage anchor seed (LAS) value generated based on the root value.

5. The method for managing pseudonym certificates and preventing tracking thereof according to claim 1, wherein the deactivating of the pseudonym certificate comprises:
identifying a linkage value of the pseudonym certificate through a linkage chain identifier (LCI); and
stopping reception of the unlocking key based on the identified linkage value.

6. The method for managing pseudonym certificates and preventing tracking thereof according to claim 1, further comprising checking whether or not the pseudonym certificate has been deactivated through a certificate revocation list (CRL) issued by the external server.

7. An apparatus for managing pseudonym certificates and preventing tracking thereof, the apparatus comprising:
a processor; and
a memory storing at least one instruction executable by the processor,
wherein when executed by the processor, the at least one instruction causes the processor to:
receive, from an external server, a pseudonym certificate in a state locked based on a root value identifiable only by the external server;
periodically receive an unlocking key for the pseudonym certificate from the external server;
activate the pseudonym certificate with the unlocking key; and
when the activated pseudonym certificate is abnormal, deactivate the pseudonym certificate,
wherein the pseudonym certificate in the state locked based on the root value is generated by generating a plurality of linkage seed values for generating an identifier (ID) of the pseudonym certificate based on the root value identifiable by the plurality of linkage authorities; generating pre-linkage values (PLV) encrypted based on the linkage seed values according to an advanced encryption standard (AES): and
generating a plurality of linkage values representing the ID of the pseudonym certificate based on the pre-linked values,
wherein the linkage seed values are generated by being grouped according to a preset periodicity into a plurality of groups which not connected to each other.

8. The apparatus for managing pseudonym certificates and preventing tracking thereof according to claim 7, wherein the external server includes a plurality of linkage authorities designated by the pseudonym certificate management apparatus.

9. The apparatus for managing pseudonym certificates and preventing tracking thereof according to claim 7, wherein the linkage seed values are encrypted based on the root value and connected in a tree structure.

10. The apparatus for managing pseudonym certificates and preventing tracking thereof according to claim 7, wherein the linkage seed values within each group are encrypted and connected, and an initial linkage seed value of each group is represented by a linkage anchor seed (LAS) value generated based on the root value.

11. The apparatus for managing pseudonym certificates and preventing tracking thereof according to claim 7, wherein in the deactivating of the pseudonym certificate, the at least one instruction further causes the processor to:
    identify a linkage value of the pseudonym certificate through a linkage chain identifier (LCI); and
    stop reception of the unlocking key based on the identified linkage value.

12. The apparatus for managing pseudonym certificates and preventing tracking thereof according to claim 7, wherein the at least one instruction further causes the processor to check whether or not the pseudonym certificate has been deactivated through a certificate revocation list (CRL) issued by the external server.

* * * * *